United States Patent
Anasta et al.

(10) Patent No.: US 11,645,711 B2
(45) Date of Patent: May 9, 2023

(54) ACCOUNT RISK DETECTION AND ACCOUNT LIMITATION GENERATION USING MACHINE LEARNING

(71) Applicant: Capital One Services, LLC, McLean, VA (US)

(72) Inventors: Jude Anasta, Hudson, NY (US); Abdelkader M'Hamed Benkreira, Brooklyn, NY (US); Tyler Maiman, Melville, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/335,398

(22) Filed: Jun. 1, 2021

(65) Prior Publication Data

US 2022/0383406 A1 Dec. 1, 2022

(51) Int. Cl.
*G06Q 40/02* (2012.01)
*G06Q 20/40* (2012.01)
*G06N 3/08* (2006.01)

(52) U.S. Cl.
CPC ........... *G06Q 40/025* (2013.01); *G06N 3/08* (2013.01); *G06Q 20/405* (2013.01)

(58) Field of Classification Search
None
See application file for complete search history.

(56) References Cited

U.S. PATENT DOCUMENTS

| | | | |
|---|---|---|---|
| 2005/0137987 A1* | 6/2005 | May | G07F 9/026 705/75 |
| 2007/0124238 A1* | 5/2007 | Hogg | G06Q 20/341 235/380 |
| 2010/0121764 A1* | 5/2010 | Niedermeyer | G06Q 20/40 705/317 |

(Continued)

OTHER PUBLICATIONS

A. Sahu, H. GM and M. K. Gourisaria, "A Dual Approach for Credit Card Fraud Detection using Neural Network and Data Mining Techniques," 2020 IEEE 17th India Council International Conference (INDICON), 2020, pp. 1-7, doi: 10.1109/INDICON49873.2020.9342462. (Year: 2020).*

(Continued)

*Primary Examiner* — Daniel S Felten
*Assistant Examiner* — Claire A Rutiser
(74) *Attorney, Agent, or Firm* — Banner & Witcott, Ltd.

(57) ABSTRACT

Methods, systems, and apparatuses are described herein for protecting user accounts using machine learning models. A machine learning model may be trained to determine whether account activity indicates a risk to credit scores. Account data, associated with a first financial account, may processed to determine whether the first financial account is associated with at least one underage user. A transaction request, associated with the first financial account, may be received. A history of transactions conducted by the first financial account may be retrieved. The trained machine learning model may be provided, as input, the transaction request and the history of transactions. An indication of risk to a credit score associated with the at least one underage (Continued)

user may be received as output from the trained machine learning model. A limitation may be added to the first financial account based on the indication of risk.

20 Claims, 5 Drawing Sheets

(56) References Cited

U.S. PATENT DOCUMENTS

| | | | |
|---|---|---|---|
| 2012/0030109 A1* | 2/2012 | Dooley Maley ... | G06Q 20/2295 705/44 |
| 2012/0311684 A1* | 12/2012 | Paulsen ............... | H04L 63/0815 726/6 |
| 2013/0144715 A1* | 6/2013 | Kranzley ........... | G06Q 30/0251 705/14.49 |
| 2013/0311266 A1* | 11/2013 | Vichich .............. | G06Q 30/0207 705/14.27 |
| 2014/0201100 A1* | 7/2014 | Rellas ................ | G06Q 30/0607 705/330 |
| 2015/0178725 A1* | 6/2015 | Poetsch .............. | G06Q 20/3572 705/44 |
| 2016/0163790 A1* | 6/2016 | Kubo .................. | H01L 29/7811 257/487 |
| 2019/0236695 A1* | 8/2019 | McKenna ............... | G06N 7/005 |
| 2020/0074546 A1 | 3/2020 | Coulter | |
| 2020/0184278 A1* | 6/2020 | Zadeh .................. | G06K 9/6264 |
| 2020/0274876 A1* | 8/2020 | Mathew .............. | G06F 21/6218 |
| 2020/0372509 A1* | 11/2020 | Phalnikar ............... | G06N 5/003 |
| 2021/0004809 A1* | 1/2021 | Goyal .................... | G06N 20/00 |
| 2021/0150621 A1 | 5/2021 | Walters et al. | |
| 2021/0389854 A1* | 12/2021 | Rose ..................... | H04W 12/72 |
| 2021/0390556 A1* | 12/2021 | Bermudez .............. | G06Q 40/02 |

OTHER PUBLICATIONS

May 22, 2017, Wodecki, "Answers to Your Top 3 Questions About Adaptive Authentication," «https://www.onelogin.com/blog/answers-to-your-top-3-questions-about-adaptive-authentication-», 5 pages.

Madden, "Idaptive is taking machine learning for authentication and applying it to authorization," «https://searchsecurity.techtarget.com/opinion/Idaptive-is-taking-machine-learning-for-authentication-and-applying-it-to-authorization-, 7 pages, publication date unknown but, printed on Jun. 1, 2021.

Feb. 25, 2021, Chuprina, "Credit Card Fraud Detection: Top ML Solutions in 2021," SPD Stories, Machine Learning, «https://spd.group/machine-learning-credit-card-fraud-detection», 23 pages.

May 24, 2018, Steensen, "Machine Learning in the Payments Industry," VISA, 34 pages.

Sep. 17, 2019, AltexSoft, "AI and Machine Learning in Finance: Use Cases in Banking, Insurance, Investment and CX," «https://www.altexsoft.com/blog/datascience/machine-learning-use-cases-in-finance/», 10 pages.

Bani-Hani, et al., "Online Authentication Methods Using in Banks and Attacks Against These Methods," ScienceDirect, Procedia Computer Science 151 (2019) 1052-1059, 8 pages.

Jul. 13, 2020, Gran, et al., "Get Your Children Saving; A Guide to Kids' Savings Accounts," «https://www.forbes.com/advisor/banking/guide-to-childrens-and-kids-savings-accounts/», 9 pages.

Dec. 31, 2020, Miller, The Points Guy, "Building Credit History: Adding your kids as authorized users to your credit cards," «https://thepointsguy.com/guide/children-authorized-users-credit-cards/», 11 pages.

Apr. 6, 2018, Luthi, "When Should My Child Get a Credit Card?," Student Credit Cards «https://www.experian.com/blogs/ask-experian/category/personal-finance/credit-cards/student-credit-cards/», 9 pages.

Mar. 13, 2019, Kh, "Is Machine Learning Solving User Authentication Challenges in App Development?," «https://datafloq.com/read/machine-learning-solving-user-authentication-apps/6152», 13 pages.

Sep. 14, 2022—(WO) International Search Report and Written Opinion—PCT/US2022/072614.

* cited by examiner

ACCOUNT RISK DETECTION AND ACCOUNT LIMITATION GENERATION USING MACHINE LEARNING

FIELD OF USE

Aspects of the disclosure relate generally to account security and machine learning. More specifically, aspects of the disclosure may provide for improvements in the method in which accounts are protected by using machine learning models to detect activity which may negatively impact an account and, in response to such activity, automatically generate limitations for the account.

BACKGROUND

Many parents open financial accounts for their children in order to help their children begin building credit and learning about financial responsibility. For example, a child might, with the help of their parent, open a credit card account and a debit card account in order to start building a credit history and to learn more about how the banking system works. By routinely conducting transactions using the credit card account and/or the debit card account, the child might thereby learn how to manage their own finances and begin to build a credit history. In some cases, that credit history might be intentionally built up by the parent: for example, by using their child's credit card to make regular small purchases (e.g., buying a soda every month), the parent can use small amounts of money to help improve their child's credit score.

Because children might be new to banking and not understand how credit works, it is not unusual for children to misuse their financial accounts. For example, it is not uncommon for children to misuse their new credit cards by using them to purchase large quantities of virtual content in online video games. While the child might not understand the long-term ramifications of this activity, such behavior can ultimately harm their credit significantly. Compounding this issue, it is unfortunately also common for some parents to abuse their children's financial accounts. Though many parents are responsible and limit their use of their children's credit to small purchases (and/or large purchases that they quickly pay off), it is not uncommon for some parents to leverage their children's credit lines for risky purchases and/or forget to pay off their children's credit cards. This activity can, over time, significantly impair the account, damage their children's credit score, and ultimately cause damage to the financial health of their child.

Aspects described herein may address these and other problems, and generally improve the safety of financial accounts and computer transaction systems by leveraging trained machine learning models to identify and respond to instances where financial accounts associated with underage users appear to be abused.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which financial accounts for underage users are monitored and limited. As will be described herein, a machine learning model may be trained to detect whether account activity indicates a risk to a credit score of an underaged user. For example, the machine learning model might be trained based on a credit score history and account activity of a variety of different financial accounts, thereby allowing the machine learning model to learn which activities (or patterns of activity) indicate a risk to a credit score. This sort of processing analyzes a large quantity of data across various financial accounts to determine patterns of activities which could risk the credit score of users, even if such activities might not be ordinarily associated with risky activity. Such activity might be a pattern of particular transactions, log-in activity on a financial website, or the like. An account associated with an underage user might then be identified. Such an account need not necessarily be a special account exclusively for underage users: the child might be a co-signer on the account, and/or a parent might have opened an otherwise normal account for their child. A transaction request might be received, and the transaction request might be associated with the account associated with the underage user. For example, a point-of-sale transaction might be initiated using a credit card associated with an underaged user. The transaction request and/or a history of transactions associated with the account might be provided as input to the trained machine learning model. In this manner, the trained machine learning model might be prompted to indicate a level of risk associated with the transaction request. The trained machine learning model might output an indication of risk to the credit score of the underage user. For example, the output might indicate that a requested transaction at a point-of-sale system might significantly negatively impact the credit score of an underaged user because, e.g., the transaction would increase credit utilization to a degree that might be difficult for the child to timely pay off. Based on that indication, a limitation might be added to the account. For example, the transaction might be approved, but a limitation might be added to the account to prevent the same transaction (or similar transactions) from being repeated in the future. As another example, the transaction request might be denied, and a limitation might be added to the account such that similar transactions are prevented in the future. In this manner, the account might be automatically protected from risky activity that might ultimately harm a underaged user's credit score.

More particularly, some aspects described herein may provide for a computing device comprising one or more processors; and memory storing instructions that, when executed by the one or more processors, cause the computing device to perform a variety of steps. The computing device may receive training data corresponding to a plurality of different financial accounts. That training data may comprise a credit score history of the plurality of different financial accounts. The computing device may train, using the training data, a machine learning model to determine whether account activity indicates a risk to credit scores. The computing device may process account data associated with a first financial account to determine whether the first financial account is associated with at least one underage user. The computing device may receive a transaction request corresponding to the first financial account. The computing device may retrieve, in response to the transaction request, a history of transactions conducted by the first financial account. The computing device may provide the transaction request and the history of transactions as input to the trained machine learning model. The computing device may receive, as output from the trained machine learning model, an indication of risk to a credit score associated with the at least one underage user. The computing device may then, based on determining that the first financial account is associated with the at least one underage user, and based on the indication of risk to the credit score associated with the at least one underage user, add at least one limitation to the first financial account.

According to some embodiments, the computing device may process the transaction request to determine a merchant identifier and compare the merchant identifier to an adult merchants list. That adult merchants list may comprise a list of one or more merchants associated with adult content. The computing device may add the at least one limitation to the first financial account based on the comparison. The training data may further comprise a history of credit utilization associated with the plurality of different financial accounts. The training data may comprise a first history of access, by a plurality of users associated with the plurality of different financial accounts, to a website, and the history of transactions may comprise a second history of access, by one or more first users associated with the first financial account, to the website. The computing device may process the account data associated with the first financial account to determine whether the first financial account is associated with at least one underage user by determining a plurality of authorized users corresponding to the first financial account and identifying at least one of the plurality of authorized users that is underage. The indication of risk to the credit score may indicate whether the transaction request and one or more previous financial transactions indicate a trend of credit risk. Add the at least one limitation to the first financial account may comprise processing the transaction request to determine a transaction type for the transaction request. In that circumstance, the at least one limitation may prevent the first financial account from funding transactions of the transaction type. The computing device may further generate an exception to the at least one limitation that permits the transaction request and prevents the first financial account from conducting additional transactions of the transaction type. Adding at least one limitation to the first financial account may comprise determining whether the transaction request corresponding to the first financial account was initiated by the underage user. The account data may comprise a list of authorized users associated with the first financial account.

Corresponding method, apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
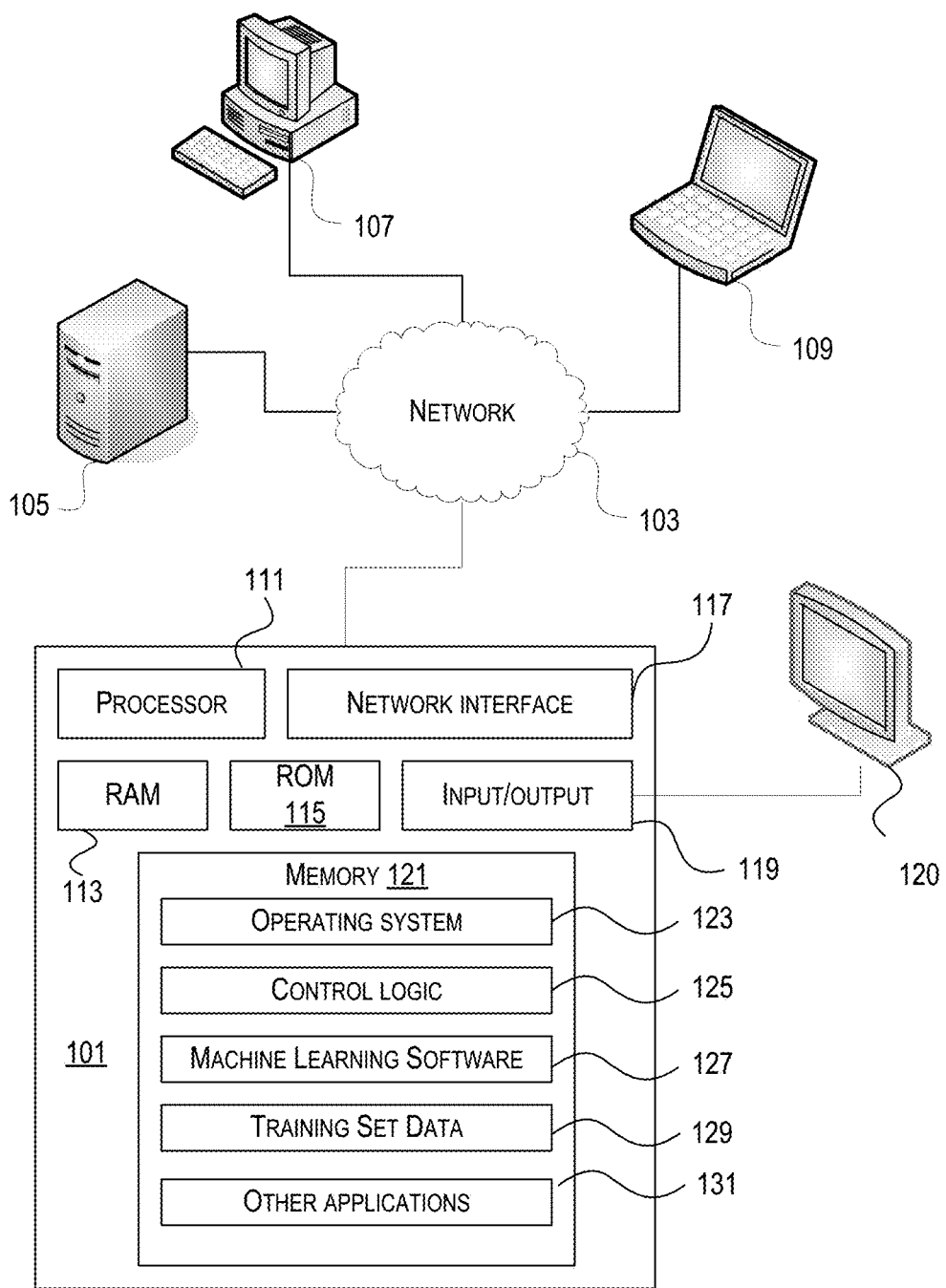
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving the safety and security of accounts by leveraging a trained machine learning model. In this manner, accounts (e.g., financial accounts) might be protected from abuse that might negatively impact an underage user.

As an example of one problem addressed by the current disclosure, a parent might initially and in good faith open a credit card account for their child, on which both they and the child are co-signers. That credit card account might have a credit limit of $5,000. The parent might begin by using the credit card account to conduct small but inconsequential transactions that they quickly pay off, thereby improving the credit score of their child. That said, the parent might at some point begin to use the credit card account inappropriately, such as gambling-related purchases, alcohol-related purchases, or the like, which they do not pay off on time. Because the parent is a co-signer on the account, the transactions might be fully valid and authorized, but might begin to harm the credit score of the child. For example, if the parent uses the entire $5,000 credit line and fails to pay it off for months, then both their and their child's credit score might be negatively impacted. This unfortunately not uncommon, and such activity can devastate the creditworthiness of the child in the future. Additionally and/or alternatively, a child might abuse their newly-acquired credit line to purchase expensive goods and/or services which they cannot easily pay off. Such abuse might, over time, harm the child's ability to pay off their debt, ultimately harming their credit score.

Aspects described herein improve the functioning of computers by improving the way in which computers can detect and react to malicious activity conducted using computer-implemented accounts. The rapid advancement of computer-aided financial transactions has made it easier to conduct transactions than ever, but this problem has introduced significant risk to the financial creditworthiness of users, particularly where those users are prone to bad spending habits. The steps described herein recite improvements to the way in which computing devices monitor transaction activity conducted by users, particularly by allowing such devices to, with the aid of a machine learning model, automatically add limitations to financial accounts. This overrides the standard way in which transactions operate, where transactions are generally allowed or denied without regard to the long-term effect in which such transactions might impact a credit score. Such transactions are conducted electronically, and the detection of fraud and risk involving these transactions is paramount. Moreover, these transactions occur quickly, such that the processes described herein must be performed quickly, efficiently, and electronically. The process described herein could not be performed by a human being and/or with pen and paper at least because it necessarily involves the use of voluminous amounts of data and machine learning models, which significantly improve the risk detection process over conventional methods. Indeed, the patterns detected in the data described herein is far too long-ranging and voluminous, and spans far too many different accounts and users, for processing by a human being, let alone hundreds of human beings. Moreover, the process described herein could not be performed by a human being and/or with pen and paper at least because it must necessarily be done quickly and accurately: after all, a conventional credit card transaction could not wait the days it would take for a human being to carefully compare the requested transaction to voluminous amounts of past data to determine whether to authorize the credit card transaction.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
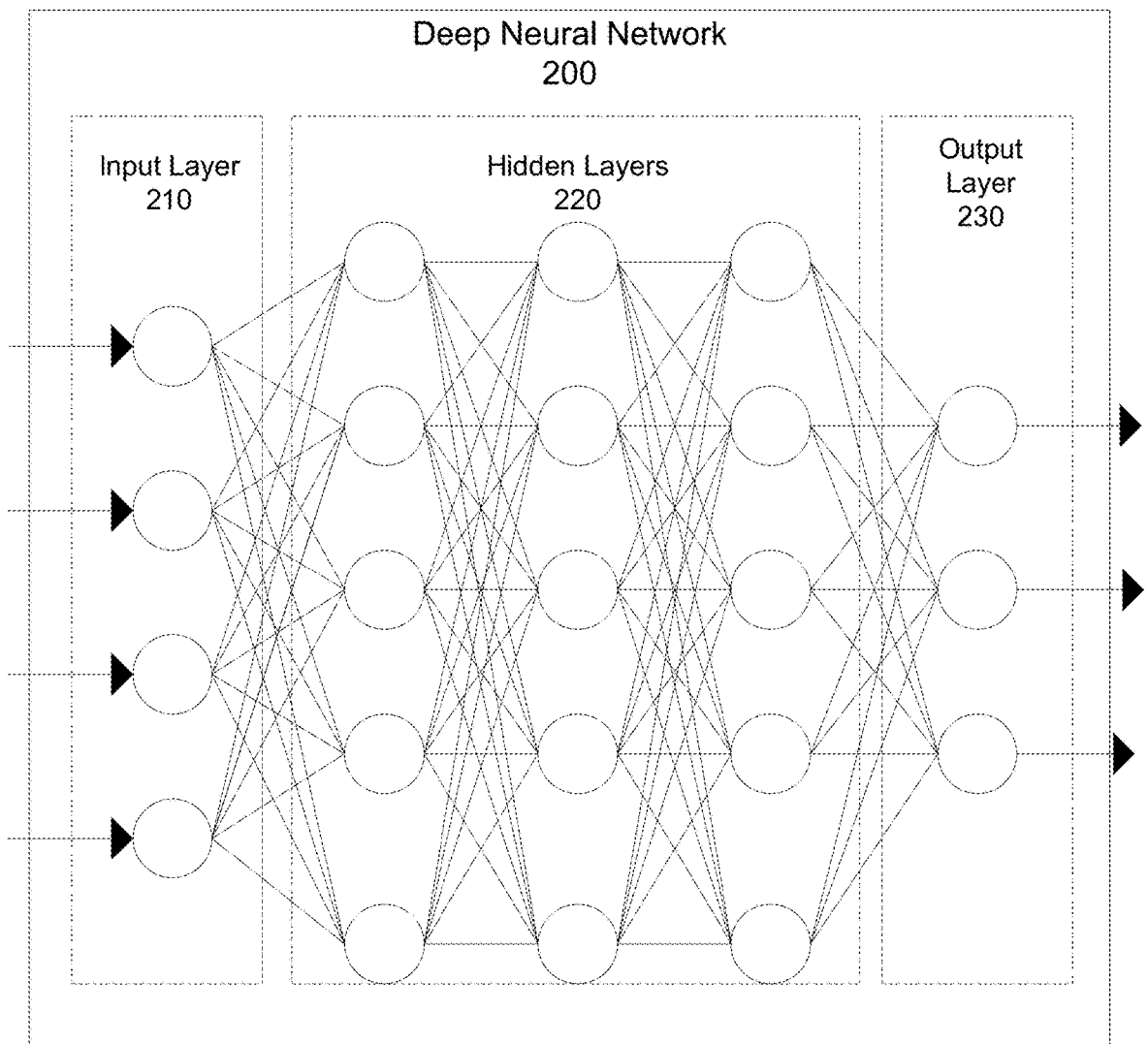
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
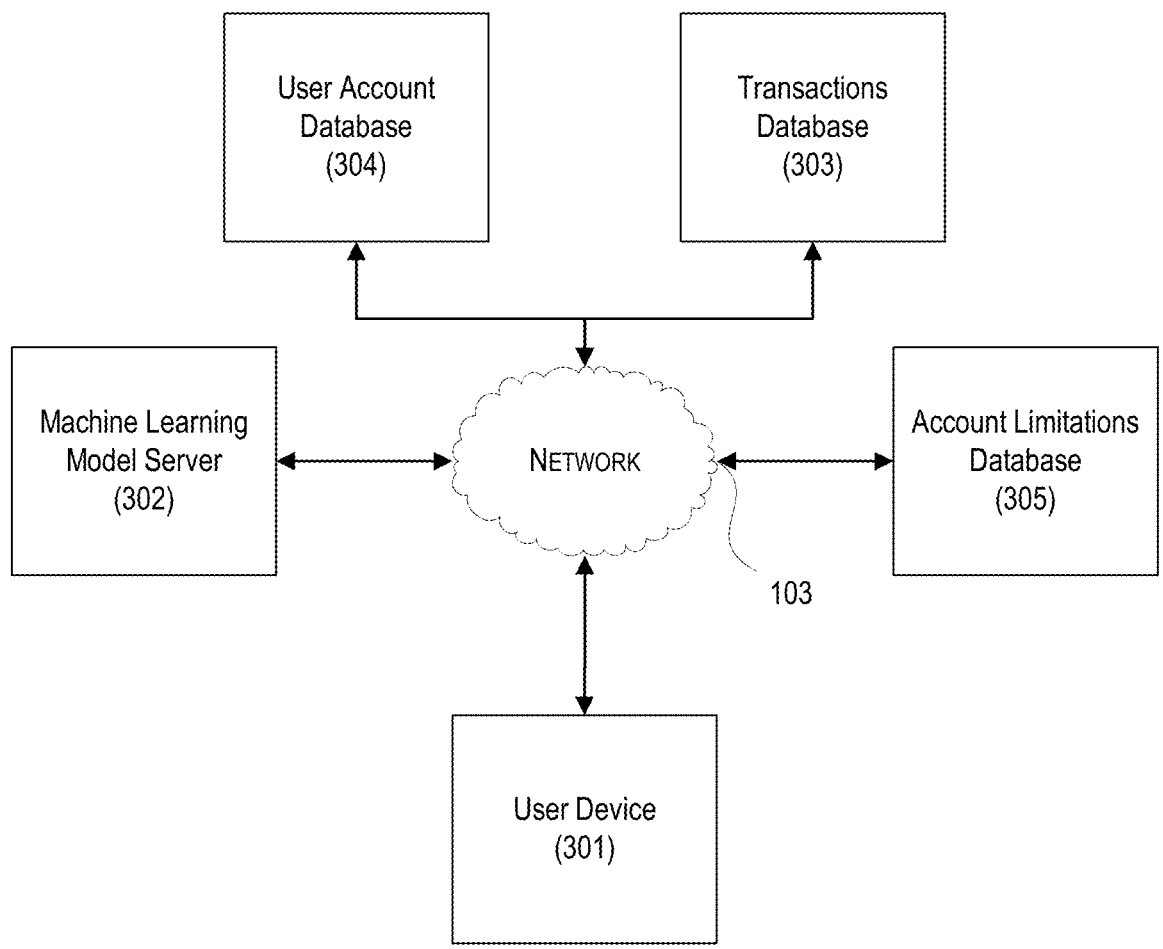
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to a machine learning model server 302, a transactions database 303, a user account database 304, and an account limitations database 305. The network 103 may be the same or similar as the network 103 of FIG. 1. Each of the user device 301, the machine learning model server 302, the transactions database 303, the user account database 304, and/or the account limitations database 305 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1. Additionally and/or alternatively, the network 103 might be omitted, and all elements shown in FIG. 3 might be part of a single computing device, such as any one of the computing devices 101, 105, 107, and 109 of FIG. 1.

As will be described in more detail below with respect to FIG. 5, the machine learning model server 302 might store and/or execute a machine learning model (e.g., based on the deep neural network architecture 200) which might be trained to detect, based on, e.g., a history of transactions, for a variety of different accounts, stored by the transactions database 303, whether a new transaction poses a risk to a credit score of a user (e.g., an underage user). The user device 301 might request a new transaction, and that transaction might be for an account associated with an underage user (e.g., as indicated by data stored by the user account database 304). The request might be provided to the trained machine learning model (e.g., as part of the machine learning model server 302), along with other data (e.g., an account history associated with the financial account, as stored by the transactions database 303). The trained machine learning model might then provide an indication of risk to the credit score of the underage user. In response to that indication of risk, a limitation might be added to the account and stored in the account limitations database 305. For example, the limitation might indicate that the requested transaction and similar transactions are prohibited from being conducted by the account.

The machine learning model server 302 may be all or portions of a computing device that provides a machine learning model which may be trained and which may receive input and provide output as described herein. The machine learning model server 302 might implement all or portions of the deep neural network architecture 200. The machine learning model server 302 might be a plurality of servers (e.g., on a cloud), such that, for example, the various nodes of the deep neural network architecture 200 might be distributed across various computing devices. Training of, input to, and/or output from the machine learning model server 302 might be conducted via, e.g., the network 103.

The transactions database 303 might comprise data relating to one or more transactions conducted by one or more financial accounts associated with a first organization. For example, the transactions database 303 might maintain all or portions of a general ledger for various financial accounts associated with one or more users at a particular financial institution. The data stored by the transactions database 303 may indicate one or more merchants (e.g., where funds were spent), an amount spent (e.g., in one or more currencies), a date and/or time (e.g., when funds were spent), or the like. The data stored by the transactions database 303 might be generated based on one or more transactions conducted by one or more users. For example, a new transaction entry might be stored in the transactions database 303 based on a user purchasing an item at a store online and/or in a physical store. As another example, a new transaction entry might be stored in the transactions database 303 based on a recurring charge (e.g., a subscription fee) being charged to a financial account.

The user account database 304 may store information about one or more user accounts, such as a username, password, demographic data about a user of the account (e.g., ages of the one or more users), or the like. The demographic data about a user may comprise information such as their age, gender, location, occupation, education level, income level, and/or the like. This information might be inferentially determined based on transaction information stored by the transactions database 303. For instance, based on a history of transactions conducted by a particular user of a particular account, the age of the user might be inferred. As one example, if the user frequently shops at wineries, the user might be inferred to be over twenty-one years old. As another example, if the user only conducts small transactions at toy stores and at school cafeterias, then the user might be inferred to be under eighteen years old. The user account database 304 might additionally and/or alternatively store content that reflects instances when a user logs in to a website, such as a website associated with an account.

The account data stored by the user account database 304 and the transactions database 303 may, but need not be related to each other. For example, the account data stored by the user account database 304 might correspond to a user account for a bank website, whereas the financial account data stored by the transactions database 303 might be for a variety of financial accounts (e.g., credit cards, checking accounts, savings accounts) managed by the bank. As such, a single user account might provide access to one or more different financial accounts, and the accounts need not be the same. For example, a user account might be identified by a username and/or password combination, whereas a financial account might be identified using a unique number or series of characters.

The account limitations database 305 may comprise data which provides one or more limitations for financial accounts. A limitation may be any form of restriction on the account, including the manner in which the account may be used. For example, a limitation may prevent an account from conducting certain types of transactions at a particular merchant, at a particular category of merchants, involving a currency figure that exceeds a threshold, during particular times of day (or during particular days), or the like. An account may have a variety of restrictions, which may wholly or partially overlap. For example, a limitation may prevent transactions over $50 and might prevent transactions at car dealerships, though most transactions at car dealerships may well exceed $50. As will be detailed below, a limitation might be configured to protect the credit score of an underage user by limiting transactions to those which might be conducted by an underage user. For instance, transactions might be limited in terms of where they might be conducted (e.g., preventing transactions at liquor stores but permitting transactions at toy stores), in terms of an amount (e.g., preventing $5,000 purchases but allowing $10 purchases), in terms of a time when the transaction is conducted (e.g., allowing transactions at 11 AM but not 11 PM), or the like. In this manner, the limitations might be applied to provide a bulwark against possible damage to an underage user's credit score while also allowing that user to continue making relatively safe purchases.

The account limitations database 305 may additionally and/or alternatively comprise exceptions to the limitations. An exception might correspond to one or more rules which might cause the limitation to not be applied. For example, an exception might provide that, while a limitation may prevent a credit card from being used for transactions over $100, the credit card may be used for transactions over $100 at gas stations if, e.g., the average price of gas has raised above a threshold. As another example, an exception might provide that, while a limitation may prevent a credit card from being used at stores outside of a certain region, the card may nonetheless be used for transactions outside of a certain region if a travel notification has been received.

Having discussed several examples of computing devices which may be used to implement some aspects as discussed further below, discussion will now turn to a method that uses a trained machine learning algorithm to detect account risk.

Figure 4:
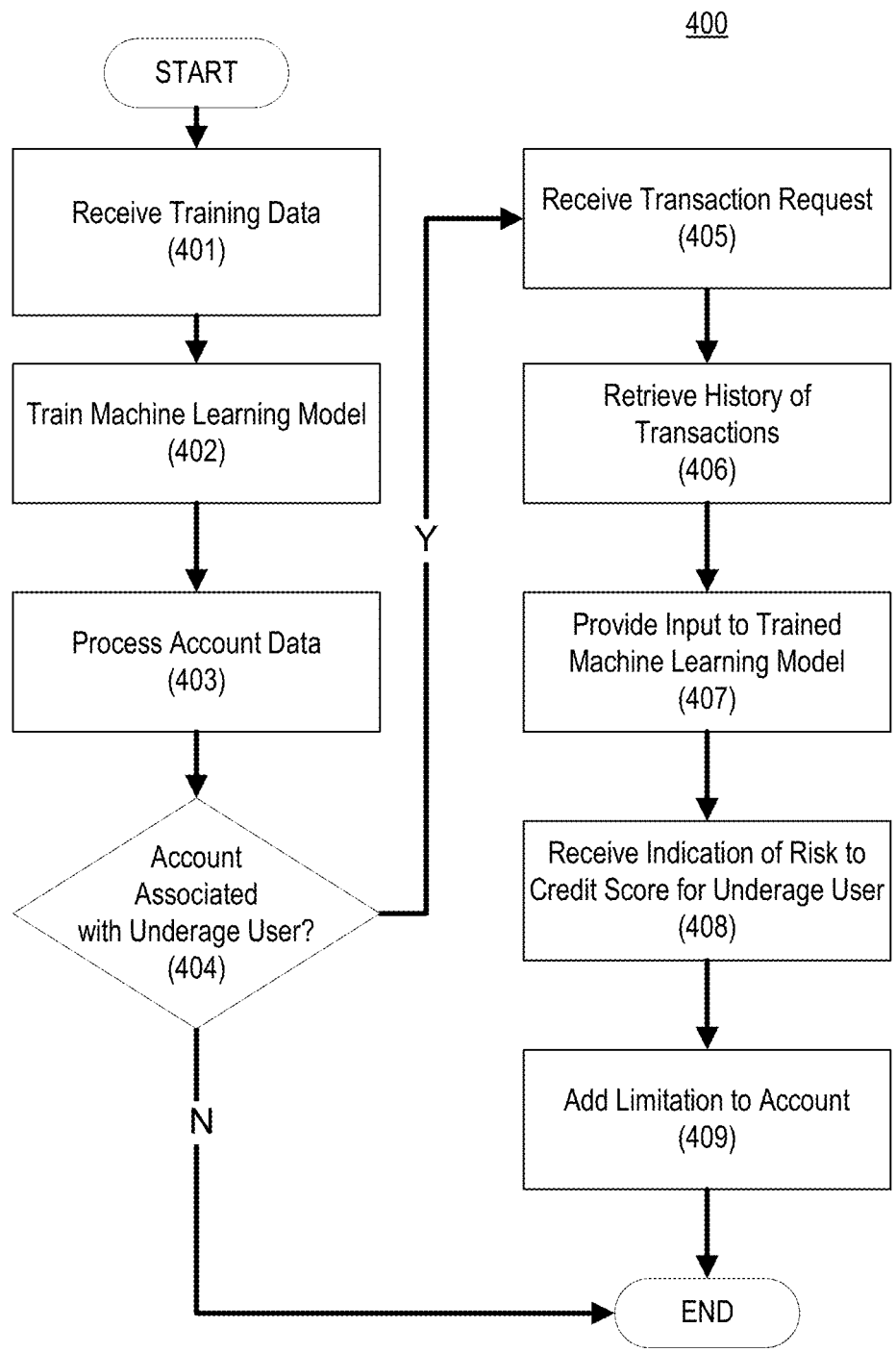
FIG. 4 depicts a flow chart comprising steps which may be performed for using a machine learning model to detect risk and add limitations to an account.

FIG. 4 illustrates an example method 400 for detecting account risk in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged or otherwise modified as desired. For example, steps involving the machine learning model (e.g., steps 401 and 402) might be performed a long time before other steps. As another example, step 403 (relating to processing account data) might be omitted and/or wholly or partially merged into step 404 (relating to determining whether a user is underage).

In step 401, the computing device may receive training data. Training data may comprise data which indicates a correlation between account activity and one or more credit scores. For example, the computing device may receive training data corresponding to a plurality of different financial accounts, wherein the training data comprises a credit score history of the plurality of different financial accounts. The training data might be retrieved, in whole or in part, from the transactions database 303. The credit score data may be received from one or more credit score reporting organizations, such that the training data might reflect data from a variety of different sources. The training data may be wholly or partially anonymized such that, for example, real-world data might be used without potentially impairing the privacy of a user. The training data may be the same or similar as the training set data 129.

The training data may comprise a history of credit utilization associated with the plurality of different financial accounts. Credit utilization may correspond to an amount of available credit used over a period of time. As a simple example, a credit card might have a $1,000 credit limit, and a user might maintain a rolling balance of $10 on the card, suggesting a 1% credit utilization. A credit score might be positively or negatively correlated with credit utilization. For example, excessively high credit utilization (particularly if a credit card is not paid off on time) might negatively impact a credit score, whereas excessively low credit utilization (e.g., not using credit) might also negatively impact a credit score.

The training data may comprise a history of access, by a plurality of users associated with the plurality of different financial accounts, to a website. Access to a website might indicate a variety of factors about the status of an account. For example, regular access to a financial account website might suggest that a user is dutifully checking their financial accounts, and therefore potentially less of a risk. That said, regular access to a financial account website might suggest that a user is concerned about their financial accounts, suggesting a greater quantity of risk. As such, it might be advantageous to track website access by a user and use such information in determining correlations with a credit score. Such website tracking data may be collected by logging instances when a user logs in to a website, by using a web browser plug-in, or the like. For example, the training data might comprise data entries that indicate one or more times that each user of a plurality of users logged into a bank website.

In step 402, the computing device may train a machine learning model. The machine learning model might be implemented by, e.g., the machine learning model server 302. The machine learning model might be trained based on the training data and in a manner that teaches the machine learning model to correlate account activity and one or more credit scores. For example, the computing device may train, using the training data, a machine learning model to determine whether account activity indicates a risk to credit scores. Such a risk might be indicated if, for example, the credit score lowers in any way, drops in an amount that satisfies a threshold, lowers in a manner that satisfies a threshold, or the like.

To train the machine learning model, the training data may be tagged or otherwise pre-processed. For example, the training data might indicate discrete instances in which a particular transaction and/or group of transactions is known to be associated with a change in a credit score. As another example, the training data might comprise data that indicates one or more rules which are used by credit score reporting firms, such as data that indicates whether certain transactions violate or comply with those rules.

In step 403, the computing device may process account data. Account data might be stored by the user account database 304 and may indicate information about one or more accounts. Processing the account data may comprise determining whether an account may be associated with an underage user. For example, the computing device may process account data associated with a first financial account to determine whether the first financial account is associated with at least one underage user. An underaged user might be defined based on local law: for example, an underaged user might be defined as being under eighteen years old (e.g., under the age of majority in many states), under twenty-one years old (e.g., under the drinking/gambling age in many states), or the like. Because customers might be located in a variety of different countries, the particular definition of adulthood might depend on the location of a user. As such, processing the account data may comprise determining whether a user is underaged based on, e.g., a geographical location of that user.

The account data may comprise a list of authorized users associated with the first financial account. For example, the account data may comprise a list of one or more users which may log-in to the account, conduct transactions involving the account, or the like. An authorized user need not be a user with full access to the account. For example, both a child and their parent might be authorized users for a credit card even if the child has relatively more limited access to the account. As another example, a parent might have the ability to log in to the account via a website, but their child might be the individual with physical possession of a credit card corresponding to the account.

Determining whether the account is associated with the at least one underage user may be based on one or more authorized users of the account, one or more beneficiaries of the account, or the like. As such, processing the account data may comprise determining a plurality of authorized users corresponding to the first financial account and identifying at least one of the plurality of authorized users that is underage. For instance, if the account has two authorized users (a child and their parent), the account may be associated with a user at least because the child is an authorized user of the account. In this way, the account need not be exclusively associated with an underaged user, but might instead have a variety of authorized users. After all, even if an underaged user is but one of four different authorized users, the underaged user's credit score might be negatively impacted if the account is abused.

Processing the account data might comprise predicting whether an account is associated with an underage user. As indicated with respect to the user account database 304, an account may be inferred to be associated with an underage user based on transaction data associated with that account (and, e.g., stored by the transactions database 303). For example, if a credit card is only used for school lunch transactions, then the credit card might be presumed to be associated with an underage user. As another example, if a credit card is regularly used for purchases at breweries, the credit card might be presumed to not be associated with an underaged user. With that said, because a financial account might be associated with a plurality of users (e.g., some underaged, some adults), whether or not a transaction is in fact allowed might depend on which user conducts the transaction. For example, a credit card might be permissibly used to purchase beer if the credit card is being used by a father, but the same credit card might be blocked from conducting the same transaction if being used by a child.

In step 404, the computing device may determine whether the account is associated with an underage user. This determination might be made based on the processing in step 403. For example, the account might be associated with an underaged user if an authorized user is tagged as underage, if an age of an authorized user satisfies a threshold associated with an age of majority, or the like. If so, the method 400 proceeds to step 405. Otherwise, the method 400 ends.

In step 405, the computing device may receive a transaction request. A transaction request might correspond to a request to conduct a transaction, and might be correlated with a particular financial account. For example, the computing device may receive a transaction request corresponding to the first financial account. The transaction request might be generated based on an attempt to purchase one or more goods and/or services. For example, the transaction request might be generated by a point-of-sale system as part of a user attempting to use a credit card to purchase one or more goods. As another example, the transaction request might be generated by an online store based on a user attempting to use a credit card to purchase one or more goods. As yet another example, the transaction request might be part of a regular (e.g., recurring) transaction, and the request might have been automatically generated by a server based on a period of time elapsing. The transaction request might correspond to a pending transaction and/or a completed transaction. As such, as will be detailed below, the transaction might be ultimately approved, but a limitation may nonetheless be applied to the account to prevent similar transactions from occurring in the future.

In step 406, the computing device may retrieve a history of transactions. The history of transactions may indicate one or more transactions conducted by an account over a period of time. For example, the computing device may retrieve, in response to the transaction request, a history of transactions conducted by the first financial account. The history of transactions might be retrieved from, e.g., the transactions database 303. The history of transactions may indicate an amount of purchases made over a period of time, a cost of purchases made over a period of time, a frequency of purchases made over a period of time, or the like. The history of transactions might be retrieved for a particular time period. For example, the computing device may query the transactions database 303 for transactions from a recent period of time, such as the last month. The history of transactions might be retrieved for a particular type of transaction that is similar to the requested transaction. For example, the computing device may query the transactions database 303 for transactions with a particular merchant, involving dollar amounts satisfying a particular threshold, in a particular geographic location, or the like.

The history of transactions may comprise a second history of access, by one or more first users associated with the first financial account, to a website. As indicated above, access to websites might, in some circumstance, indicate a risk to a credit score. For example, a user frequently checking a banking website to check an account balance might, in certain circumstances, suggest that the user might soon make large and risky purchases that would harm their credit score. That said, in other circumstances, such activity might merely indicate that the user is being a responsible spender. As also indicated above, the trained machine learning model may be trained to correlate access to a website to credit score risk. Accordingly, the history of transactions may comprise data that indicates, for a particular account, one or more instances of a user accessing a website. Such data might be stored by, e.g., the user account database 304. In this manner, as will be detailed below, the trained machine learning model may be able to detect if recent website access activity suggests potential credit score risk.

In step 407, the computing device may provide input to the trained machine learning model. The input might comprise any data which might be used for the trained machine learning model to determine a level of risk to a credit score. Such input might comprise, for instance, information from the transaction request and/or the history of transactions retrieved in step 406. For example, the computing device may provide the transaction request and the history of transactions as input to the trained machine learning model. Providing the input to the trained machine learning model may comprise, e.g., transmitting the input to the machine learning model server 302.

In step 408, the computing device may receive an indication of risk to a credit score of the underage user. The indication of risk may correlate to a risk to the underage user's credit score. For example, the computing device may receive, as output from the trained machine learning model, an indication of risk to a credit score associated with the at least one underage user. The indication of risk may be represented as a value, such as a predicted number of points which may be subtracted to the underage user's credit score if the transaction is completed. The indication of risk may be represented in other data structures as well. For example, the indication of risk may be represented as subjective and/or categorical values, such as "Low Risk," "High Risk," and the like.

The indication of risk to the credit score may indicate whether the transaction request and one or more previous financial transactions indicate a trend of credit risk. In other words, the indication of risk may indicate whether an overall trend of activity on the account, including the requested transaction, indicates risky behavior. Such risky behavior might suggest, for example, that a user is spending in increasingly excessive amounts, increasing their overall credit utilization, or the like.

In step 409, the computing device may add a limitation to the account. A limitation may be any restriction on the account, including how the account may be used. The limitation may be based on the indication of the risk to the credit score. For example, the computing device may, based on determining that the first financial account is associated with the at least one underage user, and based on the indication of risk to the credit score associated with the at least one underage user, add at least one limitation to the first financial account. The limitation may be added to the account limitations database 305 such that the limitation applies to future transactions conducted by the account. Examples of limitations are discussed below with respect to FIG. 5.

The limitation need not prevent the requested transaction from occurring. For example, the transaction request received in step 405 might be allowed, but the limitation might nonetheless be added to the account. In effect, this may allow a transaction to be processed while simultaneously preventing similar transactions from occurring in the future. This process might be particularly useful where the requested transaction itself is not necessarily risky, but where the overall pattern of transactions suggests (e.g., the indication of risk received in step 408 indicates) that the account is trending towards risky behavior.

The limitation may correspond to a merchant. For example, the computing device may process the transaction request to determine a merchant identifier. A merchant identifier might be, for example, a Merchant Category Code (MCC) or similar identifier of the identity of a merchant or category of merchants. The computing device may then compare the merchant identifier to an adult merchants list that comprises a list of one or more merchants associated with adult content. The adult merchants list might be stored by the account limitations database 305 and may indicate one or more merchants associated with adult transactions, such as transactions for alcohol, pharmaceuticals, pornography, or the like. Adding the at least one limitation to the first financial account may be based on that comparison. For example, if the merchant is identified as being on the adult merchants list, then a limitation corresponding to the merchant (and/or a corresponding category of merchant) may be added such that an account cannot be used at the merchant (and/or at similar merchants).

Adding the limitation to the account may comprise processing the transaction request to determine a transaction type for the transaction request. A transaction type might correspond to an amount of the transaction, one or more goods and/or services involved in the transaction, a geographic location of the transaction, or any other similar characterization of the transaction request. The at least one limitation may prevent the first financial account from funding transactions of the transaction type. For example, if the transaction is for $1,050, then the limitation may prevent an account from conducting future transactions over $1,000 (e.g., the limitation threshold may be determined based on the transaction amount). As another example, if the transaction is for alcohol, then the limitation may prevent the account from conducting future transactions involving alcohol. As yet another example, if the transaction is in a particularly unsafe portion of a geographic region, then the limitation may prevent future transactions within the geographic region.

Adding the limitation to the account may comprise determining whether the transaction request corresponding to the first financial account was initiated by the underage user. Because an account might have multiple authorized users, it may be permissible under certain circumstances to allow adult users to conduct transactions, even if a underaged user might be prevented from conducting similar transactions. To determine whether the transaction request is from the underage user, aspects of the transaction request might be processed to identify the requesting user. For example, if the account is associated with multiple credit cards (e.g., one for each user), the card used might indicate the identity of the authorized user requesting the transaction. As another example, the transaction request might indicate an identity of the user based on, e.g., a name provided in a field in an online shopping form. Such a determination might ultimately be used to determine whether to approve the transaction. For example, a high-risk transaction might be approved (but a limitation might nonetheless be added) if the user requesting the transaction is an adult, whereas the same high-risk transaction might be denied (and a limitation might be added) if the user requesting the transaction is underage.

The computing device may additionally and/or alternatively generate an exception to the at least one limitation that permits the transaction request and prevents the first financial account from conducting additional transactions of the transaction type. As indicated above with respect to the account limitations database 305, an exception may comprise exceptions to the limitations indicated in the account limitations database 305. For example, if a limitation provides that transactions cannot be conducted in a certain geographic area, an exception might be generated that allows transactions for gasoline such that the user of the financial account is not stranded. The exceptions may be generated and added along with the limitation, and/or might be added at a later time. For example, exceptions might be added by an authorized user (e.g., a parent of a child) and/or might be automatically generated based on a history of transactions (e.g., as stored by the transactions database 303).

Figure 5:
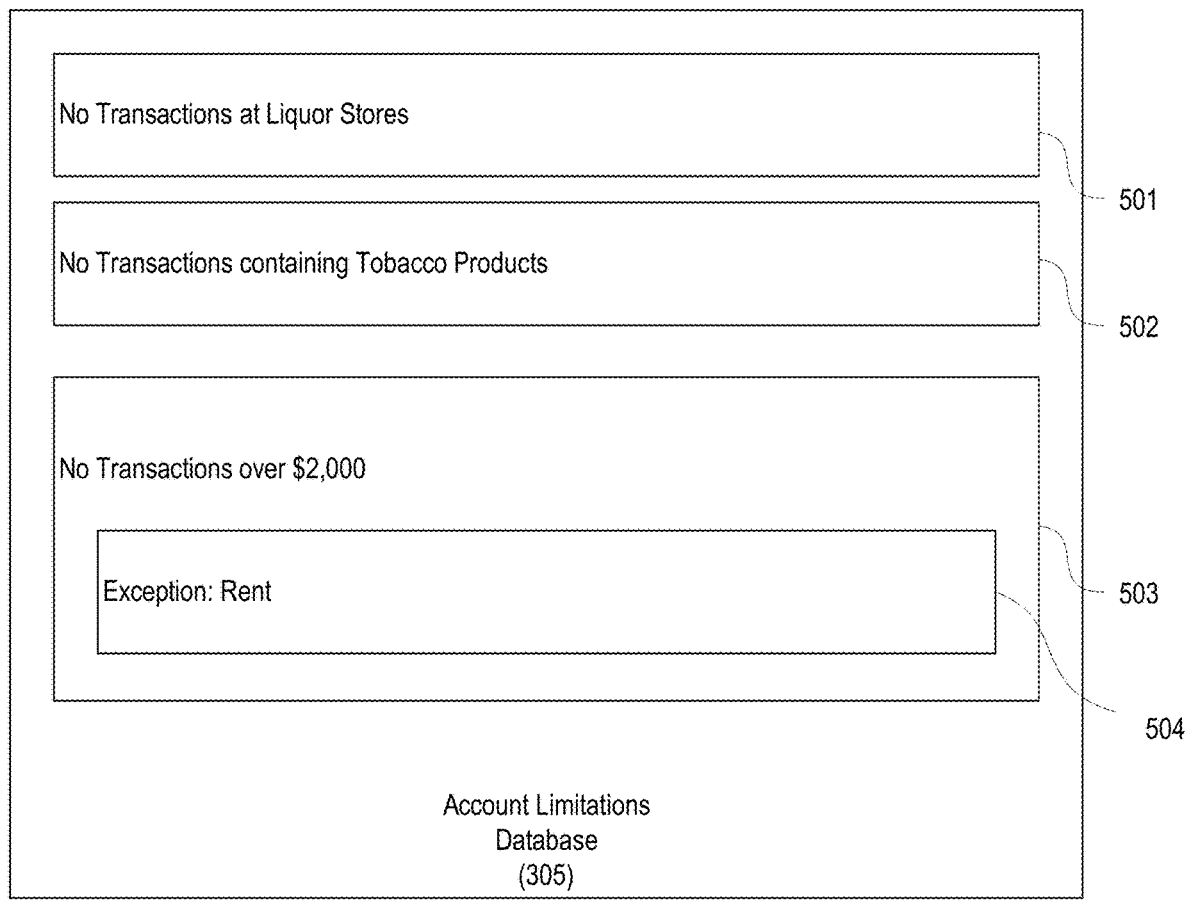
FIG. 5 depicts an example of account limitations which might be applicable to an account.

FIG. 5 shows an example of data stored by the account limitations database 305. As shown in FIG. 5, the account limitations database 305 comprises three limitations: a first limitation 501 that prevents transactions at liquor stores, a second limitation 502 that prevents transactions involving tobacco products, and a third limitation 503 that prevents transactions over $2,000. The account limitations database 305 also comprises an exception 504 that indicates an exception for the third limitation 503: specifically, though the third limitation 503 prevents transactions over $2,000, the account may nonetheless be used to pay rent.

The limitations shown in FIG. 5 illustrate how limitations may be added in a variety of different ways. The first limitation 501 illustrates that a limitation may correspond to a particular merchant and/or a category of merchant—in that case, liquor stores. The second limitation 502 indicates that limitations may correspond to particular goods and/or services—in that case, tobacco. The third limitation 503 indicates that limitations may correspond to transaction amounts, such as dollar figures.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to protect a credit score associated with at least one underage user from being negatively impacted via misuse of a first financial account, the computing device comprising:
   one or more processors; and
   memory storing instructions that, when executed by the one or more processors, cause the computing device to:
      track access to one or more websites by logging one or more instances when one or more different users log in to the one or more websites;
      receive, from a transactions database, transaction data corresponding to a plurality of different financial accounts associated with the one or more different users, wherein the transaction data indicates, for each financial account of the plurality of different financial accounts, an amount of available credit used over a period of time;
      determine training data that indicates one or more correlations between the access to the one or more websites with the amount of available credit used over the period of time;
      train, using the training data, a machine learning model, implemented using an artificial neural network comprising a plurality of nodes, to determine an amount of risk that a requested financial transaction poses to one or more credit scores of individuals associated with one or more financial accounts in view of access, by the individuals associated with the one or more financial accounts, to the one or more websites by adjusting, based on the training data, one or more weights corresponding to one or more of the plurality of nodes of the artificial neural network;
      retrieve, from a user account database, account data associated with the first financial account;
      process the account data to determine whether the first financial account is associated with the at least one underage user;
      receive, from a point-of-sale computing device, a transaction request corresponding to use of the first financial account to conduct a purchase via the point-of-sale computing device; and
      based on determining that the first financial account is associated with the at least one underage user:
         retrieve, in response to the transaction request and from the transactions database, a history of transactions conducted by the first financial account, wherein the history of transactions indicates:
            one or more financial transactions associated with the first financial account; and
            one or more instances of access, by the individuals associated with the one or more financial accounts, to the one or more websites;
         provide the transaction request and the history of transactions as input to one or more input nodes of the plurality of nodes of the artificial neural network implementing the trained machine learning model;
         receive, as output data from one or more output nodes of the artificial neural network implementing the trained machine learning model, an indication of risk that the transaction request poses to the credit score associated with the at least one underage user, wherein the indication of risk is based on the one or more instances of access to the one or more websites; and
         based on determining that the indication of risk indicates that the first financial account is being used in a manner that poses risk to the credit score associated with the at least one underage user, add at least one limitation to the first financial account, wherein the at least one limitation is configured to prevent one or more point-of-sale devices from conducting one or more future transactions based on a geographic location of the one or more point-of-sale devices.

2. The computing device of claim 1, wherein the instructions, when executed by the one or more processors, cause the computing device to:
   process the transaction request to determine a merchant identifier; and
   compare the merchant identifier to an adult merchants list, wherein the adult merchants list comprises a list of one or more merchants associated with adult content, and wherein the instructions, when executed by the one or more processors, cause the computing device to add the at least one limitation to the first financial account based on the comparison.

3. The computing device of claim 1, wherein the training data is anonymized to prevent identification of one or more users corresponding to the plurality of different financial accounts.

4. The computing device of claim 1, wherein the one or more instances of access to the one or more websites indicates one or more instances of access, by the individuals associated with the one or more financial accounts, to a banking website associated with the first financial account.

5. The computing device of claim 1, wherein the instructions, when executed by the one or more processors, cause the computing device to process the account data associated with the first financial account to determine whether the first financial account is associated with at least one underage user by causing the computing device to:
 determine a plurality of authorized users corresponding to the first financial account; and
 identify at least one of the plurality of authorized users that is underage.

6. The computing device of claim 1, wherein the indication of risk to the credit score indicates whether the transaction request and one or more previous financial transactions indicate a trend of credit risk.

7. The computing device of claim 1, wherein the instructions, when executed by the one or more processors, cause the computing device to add at least one limitation to the first financial account by causing the computing device to:
 process the transaction request to determine a transaction type for the transaction request, wherein the at least one limitation prevents the first financial account from funding transactions of the transaction type.

8. The computing device of claim 7, wherein the instructions, when executed by the one or more processors, cause the computing device to:
 generate an exception to the at least one limitation that permits the transaction request and prevents the first financial account from conducting additional transactions of the transaction type.

9. The computing device of claim 1, wherein the instructions, when executed by the one or more processors, cause the computing device to add at least one limitation to the first financial account by:
 determining whether the transaction request corresponding to the first financial account was initiated by the underage user.

10. The computing device of claim 1, wherein the account data comprises a list of authorized users associated with the first financial account.

11. A computer-implemented method configured to protect a credit score associated with at least one underage user from being negatively impacted via misuse of a first financial account, the method comprising:
 tracking access to one or more websites by logging one or more instances when one or more different users in to the one or more websites:
 receiving, from a transactions database, transaction data corresponding to a plurality of different financial accounts associated with the one or more different users, wherein the transaction data indicates, for each financial account of the plurality of different financial accounts, an amount of available credit used over a period of time;
 determining training data that indicates one or more correlations between the access to the one or more websites with the amount of available credit used over the period of time:
 training, using the training data, a machine learning model, implemented using an artificial neural network comprising a plurality of nodes, to determine an amount of risk that a requested financial transaction poses to one or more credit scores of individuals associated with one or more financial accounts in view of access by the individuals associated with the one or more financial accounts, to the one or more websites by adjusting, based on the training data, one or more weights corresponding to one or more of the plurality of nodes of the artificial neural network;
 retrieving, from a user account database, account data associated with the first financial account;
 processing the account data to determine whether the first financial account is associated with the at least one underage user;
 receiving, from a point-of-sale computing device, a transaction request corresponding to use of the first financial account to conduct a purchase via the point-of-sale computing device; and
 based on determining that the first financial account is associated with the at least one underage user:
  retrieving, in response to the transaction request and from the transactions database, a history of transactions conducted by the first financial account, wherein the history of transactions indicates:
   one or more financial transactions associated with the first financial account; and
   one or more instances of access by the individuals associated with the one or more financial accounts to the one or more websites;
  providing the transaction request and the history of transactions as input to one or more input nodes of the plurality of nodes of the artificial neural network implementing the trained machine learning model;
  receiving, as output data from one or more output nodes of the artificial neural network implementing the trained machine learning model, an indication of risk that the transaction request poses to the credit score associated with the at least one underage user, wherein the indication of risk is based on the one or more instances of access to the one or more websites; and
  based on determining that the indication of risk indicates that the first financial account is being used in a manner that poses risk to the credit score associated with the at least one underage user, adding at least one limitation to the first financial account, wherein the at least one limitation is configured to prevent one or more point-of-sale devices from conducting one or more future transactions based on a geographic location of the one or more point-of-sale devices.

12. The method of claim 11, further comprising:
processing the transaction request to determine a merchant identifier; and
comparing the merchant identifier to an adult merchants list, wherein the adult merchants list comprises a list of one or more merchants associated with adult content, and wherein adding the at least one limitation to the first financial account is based on the comparison.

13. The method of claim 11, wherein the training data is anonymized to prevent identification of one or more users corresponding to the plurality of different financial accounts.

14. The method of claim 11, wherein the one or more instances of access to the one or more websites indicates one or more instances of access, by the individuals associated with the one or more financial accounts, to a banking website associated with the first financial account.

15. The method of claim 11, wherein processing the account data associated with the first financial account to determine whether the first financial account is associated with at least one underage user comprises:
  determining a plurality of authorized users corresponding to the first financial account; and
  identifying at least one of the plurality of authorized users that is underage.

16. One or more non-transitory computer-readable media storing instructions that, when executed by one or more processors, cause a computing device to protect a credit score associated with at least one underage user from being negatively impacted via misuse of a first financial account by causing the computing device to:
  track access to one or more websites by logging one or more instances when one or more different users log in to the one or more websites;
  receive, from a transactions database, transaction data corresponding to a plurality of different financial accounts associated with the one or more different users, wherein the transaction data indicates, for each financial account of the plurality of different financial accounts, an amount of available credit used over a period of time;
  determine training data that indicates one or more correlations between the access to the one or more websites with the amount of available credit used over the period of time;
  train, using the training data, a machine learning model, implemented using an artificial neural network comprising a plurality of nodes, to determine an amount of risk that a requested financial transaction poses to one or more credit scores of individuals associated with one or more financial accounts in view of access, by the individuals associated with the one or more financial accounts, to the one or more websites by adjusting, based on the training data, one or more weights corresponding to one or more of the plurality of nodes of the artificial neural network;
  retrieve, from a user account database, account data associated with the first financial account;
  process the account data to determine whether the first financial account is associated with the at least one underage user;
  receive, from a point-of-sale computing device, a transaction request corresponding to use of the first financial account to conduct a purchase via the point-of-sale computing device; and
  based on determining that the first financial account is associated with the at least one underage user:
    retrieve, in response to the transaction request and from the transactions database, a history of transactions conducted by the first financial account, wherein the history of transactions indicates:
      one or more financial transactions associated with the first financial account; and
      one or more instances of access, by the individuals associated with the one or more financial accounts, to the one or more websites;
    provide the transaction request and the history of transactions as input to one or more input nodes of the plurality of nodes of the artificial neural network implementing the trained machine learning model;
    receive, as output data from one or more output nodes of the artificial neural network implementing the trained machine learning model, an indication of risk that the transaction request poses to the credit score associated with the at least one underage user, wherein the indication of risk is based on the one or more instances of access to the one or more websites; and
    based on determining that the indication of risk indicates that the first financial account is being used in a manner that poses risk to the credit score associated with the at least one underage user, add at least one limitation to the first financial account, wherein the at least one limitation is configured to prevent one or more point-of-sale devices from conducting one or more future transactions based on a geographic location of the one or more point-of-sale devices.

17. The non-transitory computer-readable media of claim 16, wherein the instructions, when executed by the one or more processors, cause the computing device to:
  process the transaction request to determine a merchant identifier; and
  compare the merchant identifier to an adult merchants list, wherein the adult merchants list comprises a list of one or more merchants associated with adult content, and wherein the instructions, when executed by the one or more processors, cause the computing device to add the at least one limitation to the first financial account is based on the comparison.

18. The non-transitory computer-readable media of claim 16, wherein the training data is anonymized to prevent identification of one or more users corresponding to the plurality of different financial accounts.

19. The non-transitory computer-readable media of claim 16, wherein the one or more instances of access to the one or more websites indicates one or more instances of access by the individuals associated with the one or more financial accounts, to a banking website associated with the first financial account.

20. The non-transitory computer-readable media of claim 16, wherein the instructions, when executed by the one or more processors, cause the computing device to process the account data associated with the first financial account to determine whether the first financial account is associated with at least one underage user by causing the computing device to:
  determine a plurality of authorized users corresponding to the first financial account; and
  identify at least one of the plurality of authorized users that is underage.

* * * * *